(12) United States Patent
Wang et al.

(10) Patent No.: US 10,764,312 B2
(45) Date of Patent: Sep. 1, 2020

(54) ENHANCED DATA AGGREGATION TECHNIQUES FOR ANOMALY DETECTION AND ANALYSIS

(71) Applicant: MICROSOFT TECHNOLOGY LICENSING, LLC, Redmond, WA (US)

(72) Inventors: Ge Wang, Sammamish, WA (US);
Ming Li, Sammamish, WA (US);
Lingwei Li, Sammamish, WA (US);
Jian Li, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 15/857,102

(22) Filed: Dec. 28, 2017

(65) Prior Publication Data
US 2019/0207962 A1     Jul. 4, 2019

(51) Int. Cl.
*H04L 29/06*     (2006.01)
*G06F 11/07*     (2006.01)
(Continued)

(52) U.S. Cl.
CPC ...... *H04L 63/1425* (2013.01); *G06F 11/0754* (2013.01); *G06F 21/552* (2013.01);
(Continued)

(58) Field of Classification Search
CPC . H04L 63/1425; H04L 63/1416; H04L 43/04; G06F 11/0754; G06F 21/552; G06F 3/0484; G06F 16/23; G06N 5/025
See application file for complete search history.

(56) References Cited

U.S. PATENT DOCUMENTS 7,792,660 B2    9/2010    Iyengar et al.
7,917,338 B2    3/2011    Basak et al.
(Continued)

FOREIGN PATENT DOCUMENTS

WO     2016191639 A1     12/2016

OTHER PUBLICATIONS

"Detecting Patterns and Anomalies", Retrieved From <<https://web.archive.org/web/20170910100236/http:/www.striim.com/solutions/detecting-patterns-anomalies/>>, Sep. 10, 2017, 5 Pages.
(Continued)

*Primary Examiner* — Kim T Nguyen
(74) *Attorney, Agent, or Firm* — Newport IP, LLC; Mike R. Cicero

(57) ABSTRACT

An anomaly detection system that performs data aggregation against user-defined subsets of multiple variable columns within an aggregation table. Various embodiments enable users to generate rules by defining values for user-defined subsets of variables of an aggregation table that is used to deploy numerous other rules. Thus, if an aggregation table includes hundreds of columns each associated with discrete variables, a user may generate rules for aggregating data into specific variable columns of the aggregation table rather than into all of the hundreds of variable columns. The user may also define a sliding time window for the rule to be applied against and to set an occurrence threshold for the user-defined sliding time window. When a rule is triggered, the anomaly detection system may automatically generate a post-analysis table by preemptively and selectively populating the post-analysis table with values of event data indicated by a cardinality threshold and/or filter parameters.

20 Claims, 10 Drawing Sheets

(51) Int. Cl.
  G06F 21/55 (2013.01)
  G06N 5/02 (2006.01)
  H04L 12/26 (2006.01)
  G06F 16/23 (2019.01)
  G06F 3/0484 (2013.01)

(52) U.S. Cl.
  CPC .............. *G06N 5/025* (2013.01); *H04L 43/04* (2013.01); *H04L 63/1416* (2013.01); *G06F 3/0484* (2013.01); *G06F 16/23* (2019.01)

(56) References Cited

U.S. PATENT DOCUMENTS

| | | | |
|---|---|---|---|
| 8,122,006 B2 | 2/2012 | de Castro Alves et al. | |
| 2004/0221190 A1* | 11/2004 | Roletto | H04L 41/0893 714/4.1 |
| 2007/0150520 A1 | 6/2007 | Bennett et al. | |
| 2011/0119100 A1 | 5/2011 | Ruhl et al. | |
| 2015/0213631 A1 | 7/2015 | Vander Broek | |
| 2017/0147417 A1 | 5/2017 | Sasturkar et al. | |
| 2017/0249200 A1 | 8/2017 | Mustafi et al. | |
| 2018/0357556 A1* | 12/2018 | Rai | G06Q 50/06 |
| 2019/0097876 A1* | 3/2019 | Abdulghani | H04L 63/1425 |

OTHER PUBLICATIONS

Marshall, Chris, "Real-time Clickstream Anomaly Detection with Amazon Kinesis Analytics", Retrieved From <<https://aws.amazon.com/blogs/big-data/real-time-clickstream-anomaly-detection-with-amazon-kinesis-analytics/>>, Sep. 20, 2016, 15 Pages.

Vanderbush, Adam, "Elasticsearch ElastAlert: Alerting at Scale", Retrieved From <<https://qbox.io/blog/elasticsearch-alerting-at-scale-using-elastalert>>, May 15, 2017, 9 Pages.

"International Search Report and Written Opinion Issued in PCT Application No. PCT/US2018/062157", dated Feb. 19, 2019, 13 Pages.

* cited by examiner

200

| Exemplary Event Data 110 ||||||
|---|---|---|---|---|---|
| Audit ID | Time Stamp | Operation | Gender | IP Address | Variable N |
| ⋮ | ⋮ | ⋮ | ⋮ | ⋮ | ⋮ |
| 83 | 11:57:58 | download | male | 172.67.374.1 | Value N1 |
| 84 | 11:58:13 | upload | male | 172.32.154.8 | Value N2 |
| 85 | 11:58:15 | download | female | 172.12.345.8 | Value N3 |
| 86 | 11:58:18 | download | female | 421.41.789.6 | Value N4 |
| 87 | 11:58:21 | upload | male | 217.01.121.1 | Value N5 |
| 88 | 11:58:24 | download | male | 172.12.432.8 | Value N6 |
| 89 | 11:58:26 | upload | female | 198.32.544.2 | Value N7 |
| 90 | 11:58:30 | download | male | 172.45.328.2 | Value N8 |
| 91 | 11:58:32 | download | male | 172.21.132.3 | Value N9 |
| 92 | 11:58:36 | upload | male | 217.63.187.3 | Value N10 |
| 93 | 11:58:39 | upload | female | 198.89.678.1 | Value N11 |
| 94 | 11:58:40 | download | male | 172.25.456.8 | Value N12 |
| 95 | 11:58:41 | download | female | 198.45.771.1 | Value N13 |
| 96 | 11:58:42 | upload | male | 217.14.169.1 | Value N14 |
| 97 | 11:58:49 | download | female | 198.78.456.5 | Value N15 |
| 98 | 11:58:54 | download | female | 198.14.485.2 | Value N16 |
| 99 | 11:58:58 | upload | female | 217.11.121.5 | Value N17 |
| 100 | 11:59:02 | download | male | 217.54.321.1 | Value N18 |
| ⋮ | ⋮ | ⋮ | ⋮ | ⋮ | ⋮ |

FIGURE 2

Exemplary Aggregation Table 300

| Rule ID | Operation | Gender | IP Address | Variable N | User ID | Region | WindowID | Count | Threshold |
|---|---|---|---|---|---|---|---|---|---|
| Rule 1 302(1) | download | female | - null - | - null - | ID_1234 = 12 | - null - | 59 | 0 | 10 |
| | | | | | ID_1621 = 1 | | 58 | 5 | |
| | | | | | | | 57 | 3 | |
| | | | | | ID_5124 = 1 | | 56 | 4 | |
| | | | | | | | 55 | 2 | |
| Rule 1 "Agg." | - null - | - null - | - null - | - null - | ID_1234 = 12 | - null - | 12 > 10 = Anomaly Detected | | |
| Rule 2 302(2) | - null - | male | 217.##.###.# | - null - | - null - | REG_NA = 5 | 59 | 1 | 20 |
| | | | | | | | 58 | 3 | |
| | | | | | | REG_EMEA = 6 | 57 | 2 | |
| | | | | | | | 56 | 3 | |
| | | | | | | REG_APAC = 1 | 55 | 1 | |
| | | | | | | | 54 | 3 | |
| | | | | | | | 53 | 0 | |
| Rule 2 "Agg." | - null - | - null - | - null - | - null - | - null - | No Values Exceed Threshold | No Anomaly Detected | | |

Rule 1:  Condition 1 = ("Operation" = Download)
108(1)  Condition 2 = ("Gender" = Female)
Sliding Time-Window = 5 minutes
Occurrence Threshold = 10 Occurrences / Sliding Time-Window
Aggregation Column = User ID

Rule 2:  Condition 1 = ("Gender" = Male)
108(2)  Condition 2 = ("IP Address" = Begins w/ "217.")
Sliding Time-Window = 7 minutes
Occurrence Threshold = 20 Occurrences / Sliding Time-Window
Aggregation Column = Region

FIGURE 3A

Exemplary Aggregation Table 350

| Rule ID | Operation | Gender | IP Address | Variable N | User ID | Region | WindowID | Normalized WindowID | Count | Threshold |
|---|---|---|---|---|---|---|---|---|---|---|
| Rule 1 302(1) | download | female | - null - | - null - | ID_1234 = 12 | - null - | 59 | 59×(1440/5) | 0 | |
| | | | | | ID_1621 = 1 | | 58 | 58×(1440/5) | 5 | 10 |
| | | | | | ID_5124 = 1 | | 57 | 57×(1440/5) | 3 | |
| | | | | | | | 56 | 56×(1440/5) | 4 | |
| | | | | | | | 55 | 55×(1440/5) | 2 | |
| Rule 1 "Agg." | - null - | - null - | - null - | - null - | 14 | - null - | 14 > 10 = Anomaly Detected | | | |
| Rule 2 302(2) | - null - | male | 217.##.###.# | - null - | - null - | REG_NA = 5 | 59 | 59×(1440/7) | 1 | |
| | | | | | | REG_EMEA = 6 | 58 | 58×(1440/7) | 3 | |
| | | | | | | REG_APAC = 1 | 57 | 57×(1440/7) | 2 | 20 |
| | | | | | | | 56 | 56×(1440/7) | 3 | |
| | | | | | | | 55 | 55×(1440/7) | 1 | |
| | | | | | | | 54 | 54×(1440/7) | 3 | |
| | | | | | | | 53 | 53×(1440/7) | 0 | |
| Rule 2 "Agg." | - null - | - null - | - null - | - null - | - null - | 12 | 12 > 20 = No Anomaly Detected | | | |

Rule 1: Condition 1 = ("Operation" = Download)
108(1) Condition 2 = ("Gender" = Female)
Sliding Time-Window = 5 minutes
Occurrence Threshold = 10 Occurrences / Sliding Time-Window
Aggregation Column = User ID

Rule 2: Condition 1 = ("Gender" = Male)
108(2) Condition 2 = ("IP Address" = Begins w/ "217.")
Sliding Time-Window = 7 minutes
Occurrence Threshold = 20 Occurrences / Sliding Time-Window
Aggregation Column = Region

FIGURE 3B

ENHANCED DATA AGGREGATION TECHNIQUES FOR ANOMALY DETECTION AND ANALYSIS

BACKGROUND

Some anomaly detection systems allow users to define custom rules for triggering notifications when computing events match conditions of the rules. For example, a rule may be designed to notify a user when a threshold number of computing events match user-defined conditions within a predetermined time window. Some anomaly detection systems use aggregation techniques that cannot aggregate data based on user-defined subsets of variable columns that exist within an aggregation table. For example, if an aggregation table includes ten ("10") variable columns, some aggregation techniques cannot perform data aggregation against a user-defined subset of five ("5") of these columns. These systems generate separate aggregation tables for each custom rule which, unfortunately, increases the amount of computing resources consumed for table management. One reason for the increase in consumed computing resources is that the data size of an aggregation table for a particular rule depends on how many discrete computing events satisfy the conditions of the particular rule. This results in some anomaly detection systems maintaining aggregated data across a large number of relatively sparse aggregation tables—a computationally inefficient manner of storing and/or accessing the aggregated data in comparison to maintaining a single relatively larger table.

Furthermore, some anomaly detection systems are limited to applying rules uniformly across a single predetermined time window that is hard-coded into the system. These systems cannot enable various users to customize some rules to be applied to a first custom time window and others to be applied to a second custom time window of a different length.

It is with respect to these and other considerations that the disclosure made herein is presented.

SUMMARY

Technologies described herein enable an anomaly detection system to perform data aggregation against user-defined subsets of multiple variable columns within an aggregation table. Various embodiments display a rule-generation graphical user interface (GUI) for enabling users to generate an anomaly detection rule (also referred to herein as a "rule") by defining values for user-defined subsets of variables of an aggregation table that is used to deploy numerous other rules. For example, in an instance where an aggregation table includes hundreds of variable columns each associated with discrete variables, embodiments described herein enable a user to generate rules for aggregating data into specific variable columns of the aggregation table (e.g., based on the user-defined subsets of variables) rather than into all of the hundreds of variable columns. In this way, a single aggregation table may be used to deploy rules that individually correspond to different user-defined subsets of variables. In some embodiments, the rule-generation GUI may further enable the user to define a sliding time window for the rule to be applied against and to set an occurrence threshold for the user-defined sliding time window. As a specific but non-limiting example, the user may define specific values for two ("2") variables and then define a sliding time window of ten ("10") minutes and an occurrence threshold of five ("5"). In this specific example, embodiments of the anomaly detection system described herein may monitor computing events in substantially real-time (e.g., near real-time) to determine when five ("5") or more computing events match the specific values for the two ("2") variables within the last ten ("10") minutes. Then, responsive to such a determination, embodiments described herein may perform various actions such as, for example, notifying the user that an anomaly has occurred and/or generating a post-analysis table to facilitate analysis of the anomaly.

The disclosed technologies thus provide benefits over existing anomaly detection systems which do not facilitate aggregating data based on user-defined subsets of variable columns that exist within an aggregation table. For example, unlike existing anomaly detection systems which generate separate aggregation tables for each rule, the techniques described herein enable an anomaly detection system to simultaneously deploy numerous rules that depend from various user-defined subsets of variables by aggregating data into a single aggregation table. The disclosed technologies provide further benefits over existing anomaly detection systems by allowing users to define sliding time windows that differ across the various rules that are deployed by aggregating data into the single aggregation table. For example, the same aggregation table may be used to deploy rules that specify a first time window and other rules that specify a second time window that is longer than the first time window. In some implementations, the anomaly detection service may normalize the time windows that differ from rule to rule so that the event data can be aggregated into the aggregation table based on a single "normalized" time window. For example, the anomaly detection service may scale time stamps for individual computing events based on a predetermined scaling factor to convert the user-defined sliding time windows into a common sliding time window for the aggregation table.

In an exemplary embodiment, the anomaly detection system may receive "raw" event data indicating values for variables that describe characteristics of multiple computing events. For example, for each of the multiple computing events, the event data may indicate values for a first variable through an N-th variable. Exemplary variables include, but are not limited to, an operation corresponding to the computing event (e.g., download, upload, delete, etc.), a gender of a user that initiated the computing event, and/or an IP address from where the computing event was initiated. The anomaly detection system may further receive rule data that defines rules for triggering various actions such as, for example, notifying a user of a detected anomaly and/or generating a post-analysis table to facilitate analysis of the detected anomaly. Individual rules may indicate an occurrence threshold for predefined values of a user-selected subset of the variables indicated in the event data. Individual rules may further indicate a user-defined sliding time window for the occurrence threshold to be applied against.

The anomaly detection system may generate an aggregation table that includes variable columns corresponding to each of the variables of the event data (e.g., the aggregation table may include a first variable column through an N-th variable column). The aggregation table may further include rule rows that correspond individually to the rules. For example, in a scenario where the rule data defines ten ("10") rules, the aggregation table may include an individual rule row for each of the ten ("10") rules. The aggregation table may further include a count column for indicating rule satisfaction counts for the individual rules. For example, in a rule row that corresponds to a particular rule, the count column may indicate how may computing events have occurred both within a user-defined sliding time window and that have variables values defined by the particular rule.

In various embodiments, the anomaly detection system may determine null subsets of variables corresponding to the individual rules. For example, in a scenario in which the aggregation table includes a first variable column through an N-th variable column and in which a particular rule defines values for only the first variable and a second variable, the anomaly detection system may determine that a third variable through the N-th variable represent a null subset for the particular rule. That is, the particular rule does not specify values for these variables and, therefore, satisfaction of the particular rule is independent of these variables. The anomaly detection system may then aggregate the event data into the aggregation table in real-time by setting rule satisfaction counts within the count column for each of the individual rule rows that correspond to the individual rules. The anomaly detection system may omit "rule-inapplicable" values from the aggregation table based on having determined the null subsets of variables. For example, for a rule row that corresponds to the particular rule defining values for only the first variable and the second variable, values for the third variable through the N-th variable may be omitted based on these values being "rule-inapplicable." For each individual rule, the anomaly detection system may monitor the rule satisfaction counts against an occurrence threshold to determine when anomalies occur and, therefore, when to perform actions corresponding to the individual rules. In an exemplary embodiment, the anomaly detection system may respond to a rule satisfaction count for a particular rule satisfying an occurrence threshold defined by that rule by automatically generating a post-analysis table to facilitate post-anomaly analysis. Exemplary post-analysis tables may include, but are not limited to, various data fields that are taken from the aggregation table and/or from the raw event data.

In some embodiments, the anomaly detection system may use a cardinality threshold to determine which variables from the aggregation table and/or "raw" event data are to have corresponding values populated into the post-analysis table. For example, values for variables of the aggregation table having a cardinality below the cardinality threshold may be prepopulated into the post-analysis table whereas variables having a cardinality above the cardinality threshold may be omitted from the post-analysis table, or vice versa. As used herein, the term "cardinality" may refer generally to a number of "actual" values and/or "potential" values for a particular variable. For example, in a scenario where an aggregation table includes a variable column to store values of a "gender" variable that indicates gender(s) of user's performing various computing events, and wherein the potential values for this variable are male and female, the cardinality of the "gender" variable column may aptly be described as two ("2"). As another example, in a scenario where an aggregation table includes a variable column to store values of an "IP address" variable that indicates IP addresses from where computing events originate and wherein the actual values for this variable include one-thousand ("1,000") discrete IP addresses, the cardinality of the "IP address" variable column may aptly be described as one-thousand ("1,000")—notwithstanding the practically limitless number of potential IP addresses. As used herein, the term "cardinality threshold" may generally refer to a cardinality level that indicates which variables of a particular aggregation table are to have values preemptively populated into a post-analysis table. For example, embodiments described herein may identify variables having a cardinality below a cardinality threshold and populate values thereof into the post-analysis table without those values being explicitly requested by a user after detecting an anomaly that triggers generation of the post-analysis table.

In some embodiments, the anomaly detection system may deploy filter parameters against values for a variable to determine which computing events from the aggregation table and/or "raw" event data are to have corresponding values populated into the post-analysis table. For example, computing events that have values for a particular variable that satisfy the filter parameters may be prepopulated into the post-analysis table whereas computing events that have values for that particular variable that do not satisfy the filter parameters may be omitted from the post-analysis table, or vice versa. As a specific but non-limiting example, filter parameters may define a range of IP addresses (e.g., any IP address beginning with "217.") to cause all computing events that were initiated from a computer(s) having an IP address within that range to be preemptively populated into a post-analysis table. As used herein, the term "filter parameters" may refer generally to any definition and/or mechanism that facilitates parsing computing events according to characteristics and/or attributes of variable values corresponding to the computing events.

Generation of a post-analysis table using event data having varying characteristics (e.g., varying numbers of variables, varying data sizes, etc.) may result in widely varying degrees of computational complexity. Accordingly, various embodiments described herein may determine characteristics of the event data. Then, based on these characteristics, various embodiments may select between a plurality of data-processing platforms that are deployable to parse the event data for generating the post-analysis table. In this way, the anomaly detection system described herein may select a technology that is "right-sized" for generating any particular post-analysis table. Exemplary data-processing platforms include, but are not limited to, relational database management systems (e.g., ORACLE DATABASE, MICROSOFT SQL SERVER, MySQL by ORACLE CORPORATION, etc.), non-relational database management systems (e.g., ORACLE NoSQL DATABASE, AMAZON DynamoDB, etc.), and/or MapReduce systems (e.g., APACHE HADOOP, etc.). Various considerations for selecting between the data-processing platforms are described in more detail below.

It should be appreciated that the described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. For instance, by aggregating event data into a single aggregation table that is usable to monitor for anomalies defined by a multitude of rules which individually define values for different subsets of the variables of the aggregation table, the techniques disclosed herein improve the computational efficiency over existing systems which generate separate tables for each rule. For example, the disclosed techniques greatly reduce the memory requirements as well as processing cycles required by existing systems. It can be appreciated that the efficiencies that the disclosed techniques afford over the aforementioned existing systems has the practical effect of expanding the number of unique customer-defined anomaly detection rules which can be implemented using modern computing systems. More specifically, modern computing systems that currently exist lack the computational power that would be required to build separate tables for each rule as customer demand for anomaly detection services continues to proliferate. Stated plainly, although building and maintaining separate aggregation tables for the vast number of rules that customers are currently demanding may be possible in theory, it is not possible in practice as modern computing systems cannot handle such computationally intensive tasks. The techniques disclosed herein improve the efficiencies with regard to deploying vast numbers of anomaly detection rules and, therefore, mitigate limitations associated with deploying existing anomaly detection techniques using modern computing systems. Other technical effects other than those mentioned herein can also be realized from implementations of the technologies disclosed herein.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2 illustrates a table that includes exemplary event data that is usable by an anomaly detection service for aggregation into the aggregation table.

FIG. 3A illustrates an exemplary aggregation table that has been constructed in association with a first rule that indicates values for a first variable subset and a second rule that indicates values for a second variable subset that is different than the first variable subset.

FIG. 3B illustrates an exemplary aggregation table that has been constructed in association with the first rule and the second rule of FIG. 3A wherein the user-defined sliding time windows have been converted to a common sliding time window of fixed length.

DETAILED DESCRIPTION

Figure 1:
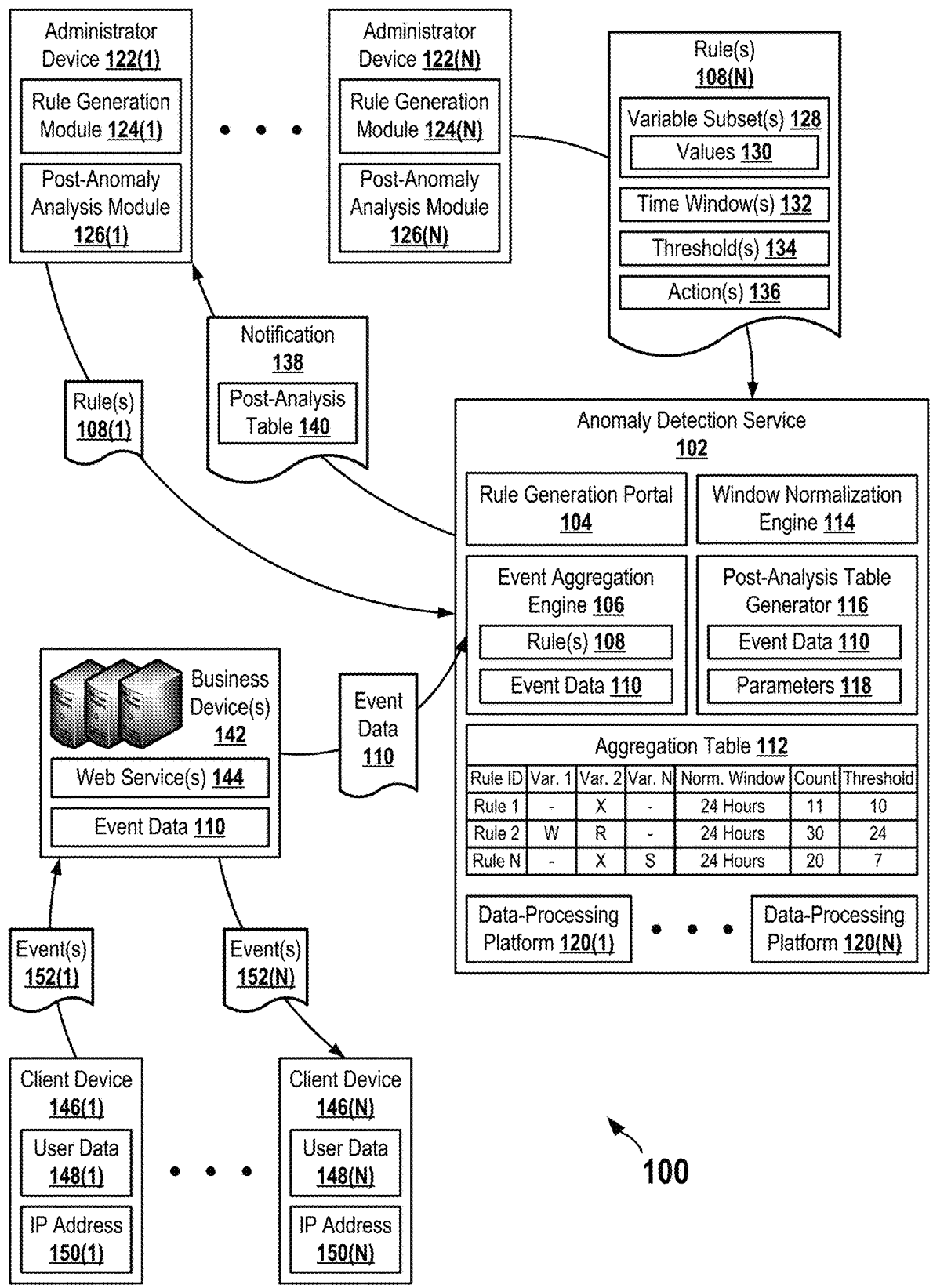
FIG. 1 is a system diagram showing aspects of an illustrative system for aggregating event data into an aggregation table based on user-defined subsets of multiple variable columns within the aggregation table.

The following Detailed Description describes technologies that enable an anomaly detection system to perform data aggregation against user-defined subsets of multiple variable columns within an aggregation table. Generally described, some embodiments display a rule-generation graphical user interface (GUI) for enabling users to generate anomaly detection rules (also referred to herein as "rules") by defining values for user-defined subsets of numerous variables that are included within an aggregation table. Various embodiments further enable the users to define custom sliding time windows for individual rules to be applied against. For example, a user may define a first rule that indicates first values for a first user-defined subset of variables as well as a first sliding time window and a first occurrence threshold. The first rule may further define an action to be taken when the number of computing events that have the first values for the first user-defined subset occurring within the first sliding time window reach or exceed the first occurrence threshold. Continuing with this example, the user (or some other user) may also define a second rule that indicates second values for a second user-defined subset of variables and also a second sliding time window and second occurrence threshold. In this example, notwithstanding differences between the first and second variable subsets and/or first and second sliding time windows, the anomaly detection system described herein can aggregate event data into a single aggregation table to simultaneously deploy both the first rule and the second rule. Responsive to a rule being satisfied (e.g., a threshold number of computing events matching a rule's user-defined variables within that rule's sliding time window), embodiments described herein may perform various actions such as, for example, notifying the user that an anomaly has occurred and/or generating a post-analysis table to facilitate analysis of the anomaly.

In various implementations, the anomaly detection system may generate a post-analysis table based on various parameters such as, for example, cardinality thresholds and/or filter parameters to enable a user to analyze a detected anomaly (e.g., as defined by a rule). Application of these parameters against event data having varying characteristics may result in widely varying degrees of computational complexity required to generate a post-analysis table. Accordingly, various embodiments described herein may determine characteristics of the event data to select between a plurality of data-processing platforms that are deployable (individually and/or in combination) to parse and/or compile the event data for generating the post-analysis table. Exemplary data-processing platforms include, but are not limited to, relational database management systems (e.g., ORACLE DATABASE, MICROSOFT SQL SERVER, MySQL by ORACLE CORPORATION, etc.), non-relational database management systems (e.g., ORACLE NoSQL DATABASE, AMAZON DynamoDB, etc.), and/or MapReduce systems (e.g., APACHE HADOOP, etc.).

Turning now to FIG. 1, details are provided regarding an illustrative operating environment and several software components disclosed herein. In particular, FIG. 1 is a system diagram showing aspects of an illustrative system 100 for aggregating event data into an aggregation table based on user-defined subsets of multiple variable columns within the aggregation table. The system 100 shown in FIG. 1 includes an anomaly detection service 102 that enables users to generate rules 108 for anomaly detection by defining values 130 for user-defined subsets of variables included within an aggregation table 112. The anomaly detection service 102 further enables users to define different sliding time windows for individual ones of the rules 108 and utilizes techniques for deploying the same aggregation table to monitor the individual rules using the different sliding time windows. The anomaly detection service 102 may be implemented on one or more computing devices such as the example computing device architecture shown in FIG. 9 and described in more detail below.

As shown in FIG. 1, the anomaly detection service 102 may comprise a rule-generation portal 104 for enabling users to generate rules 108 for monitoring computing events to detect anomalies. For example, the rule-generation portal 104 may communicate various details of the anomaly detection service 102 to one or more administrator devices 122 to enable users to use a rule-generation module 124 to define various aspects of the rules 108 such as, for example, variable subsets 128 and values 130 corresponding to individual variables of the variable subsets 128. The rule-generation portal 104 may further enable users to define time windows 132 for individual rules and thresholds 134 indicating how many computing events must match the values 130 for the variable subsets 128 within the user-defined time windows 132 to trigger one or more actions 136. The techniques described herein enable users to define time windows 132 that vary from rule to rule. For example, a user may define a first rule that is satisfied when a threshold of twenty ("20") computing events having the user-defined values 130 occur within a sliding time window of thirty ("30") minutes while also defining a second rule that is satisfied when a threshold of ten ("10") computing events having different user-defined values occur within a sliding time window of five ("5") minutes. In various implementations, the techniques described herein also enable users to define the action(s) 136 to be performed by the anomaly detection service 102 upon determining that a particular rule has been satisfied. Exemplary actions 136 include, but are not limited to, generating a notification 138 to inform a user that an anomaly has been detected and/or generating a post-analysis table 140.

The anomaly detection service 102 further includes an event aggregation engine 106 for aggregating event data 110 into an aggregation table 112 for the purpose of detecting anomalies based on the user-defined rules 108. The aggregation table 112 may include rule rows that uniquely correspond to individual ones of the rules 108 wherein each individual rule row indicates values 130 for one or more variable columns of the aggregation table 112. In the illustrated example, the aggregation table 112 includes a first rule row that corresponds to a "Rule 1" (e.g., as indicated in a "Rule ID" column) and indicates a value of "X" for a variable column that corresponds to "Var. 2" (e.g., short for Variable 2). The first rule row also indicates null values for variable columns that correspond to "Var. 1" and "Var. N" to indicate that "Rule 1" does not specify values for these variables. When aggregating the event data 110 into an individual rule row of the aggregation table 112, the event aggregation engine 106 may ignore values for variables that are marked as "null" for that individual rule row. For example, to aggregate data for a particular computing event into the aggregation table 112, the event aggregation engine 106 may identify which variables are relevant to any particular rule and then determine whether the values for the "relevant" variables match the values specified by the particular rule. If the "relevant" values for the particular computing event do match an individual rule, then the event aggregation engine 106 may update a count column accordingly without regard to the values of any variables marked as null.

The anomaly detection service 102 may monitor values within the count column while the event aggregation engine 106 aggregates event data 110 into the aggregation table 112 in substantially real-time. Ultimately, when a count value (i.e., the value indicated in the count column) for an individual rule reaches or exceeds a threshold 134 for that individual rule 108, the anomaly detection service 102 may automatically perform one or more actions 136 corresponding to that individual rule 108. As illustrated, the anomaly detection service 102 receives event data 110 in substantially real-time from one or more business devices 142. Exemplary business device(s) 142 include, but are not limited to, server-type computers that are designed to deploy various web service(s) 144. As a specific but non-limiting example, the web service(s) 144 may be an online media service (e.g., YOUTUBE, VIMEO, METACAFE, etc.) that enables a user to upload media content for other users to access, download media content to a local device, and/or delete media content from storage of the business devices 142 (e.g., to make that media content no longer available online). The business devices 142 may interact with one or more client devices 146 to facilitate computing events 152. As illustrated, the business device(s) 142 interact with a first client device 146(1) through an N-th client device 146(N) to facilitate a first event 152(1) (also referred to herein as a "computing event") through an N-th event 152(N). As described above, exemplary computing events include an upload of data from a client device 146 to the business device(s) 142, a download of data from the business device(s) 142 to a client device 146, and/or an instruction from a client device 146 to delete data from the business device(s) 142.

Individual computing events 152 may have various characteristics that correspond to one or more of the first variable column through the N-th variable column of the aggregation table 112. For example, as illustrated, the client devices 146 may include user data 148 that indicates various characteristics (e.g., age, gender, ethnicity, interests, nationality, residency, etc.) of a user associated with the client devices 146. Thus, in a scenario where the aggregation table 112 includes a "gender" variable column that indicates gender(s) of users performing various computing events 152, the event data 110 may include a portion of the user data 148 indicating genders of users that initiate the various events 152. As further illustrated, IP addresses 150 may be associated with one or more of the client devices 146. Thus, in a scenario where the aggregation table 112 includes an "IP address" variable column that indicates IP addresses from where the various events 152 originate, the event data 110 may indicate the IP address corresponding to each individual event 152.

With respect to the data flow scenario of FIG. 1, the anomaly detection service 102 may first receive the rules 108 from one or more administrator devices 122 being used to expose the rule-generation module 124. As described above, each individual rule 108 may define one or more of: a variable subset 128 and corresponding values 130; a time window 132 for the rule 108 to be applied against; and/or a threshold 134 defining how many computing events 152 must satisfy the values 130 within the time window 132 to trigger an action 136. Upon receiving one or more rules 108, the anomaly detection service 102 may populate the aggregation table 112 with rule rows that correspond individually to the rules 108. That is, the aggregation table 112 may include an individual rule for each of the individual rules 108.

Then, the anomaly detection service 102 may receive the event data 110 from one or more business device(s) 142 that generate the event data 110 based on numerous computing events 152. In the illustrated but non-limiting scenario, the computing events 152 occur in association with one or more client devices 146. For example, persons that are operating the client devices 146 may initiate the computing events 152 (e.g., by uploading content to the business devices 142, etc.). In some implementations, the event data 110 may be generated and transmitted by the business devices 142 to the anomaly detection service 102 in real-time or near real-time.

Upon receiving the event data 110, the anomaly detection service 102 may aggregate the event data 110 into the aggregation table 112. For example, the anomaly detection service 102 may analyze portions of the event data 110 (e.g., that correspond to unique computing events 152) with respect to each individual rule row to determine whether each unique computing event 152 satisfies the values 130 for the user-defined variable subset 128 of each individual rule 108. In some implementations, the anomaly detection service 102 may include a window normalization engine 114 that is configured to normalize the time windows 132 that differ from rule to rule so that the event data 110 can be aggregated into the aggregation table 112 based on a single "normalized" time window. For example, as described in more detail below, the anomaly detection service 102 may scale time stamps for individual computing events based on a predetermined scaling factor to convert the user-defined sliding time windows into a common sliding time window for the aggregation table 112. In the illustrated example, time stamps for the individual computing events 152 are being scaled to enable the event data 110 to be aggregated into the aggregation table 112 using a common sliding time window of twenty-four ("24") hours (i.e., "1440" minutes).

While aggregating the event data 110 into the aggregation table 112, the anomaly detection service 102 monitors rule satisfaction counts (i.e., the value indicated in the "count" column) for the individual rules 108 against the thresholds 134 for the individual rules 108. Ultimately, the rule satisfaction count for any particular rule row reaching or exceeding the threshold 134 for that rule row triggers the anomaly detection service 102 to perform various actions 136 corresponding to that particular rule. In the illustrated scenario, the actions 136 include deploying the post-analysis table generator 116 to generate the post-analysis table 140 and then transmitting the post-analysis table 140 to an administrator device 122 in a notification 138 (e.g., by embedding the post-analysis table 140 into the notification 138 and/or by providing a hyperlink to the post-analysis table 140 within the notification 138). The notification 138 may be designed to inform an administrator that an anomaly defined by the particular rule has occurred. Upon receiving the notification 138 and the post-analysis table 140, an administrator may use a post-anomaly analysis module 126 to view and/or manipulate the post-analysis table 140 to analyze portions of the event data 110 that occurred contemporaneously with the detected anomaly.

Turning now to FIG. 2, a table 200 is shown that illustrates exemplary event data 110 that is usable by the anomaly detection service 102 for aggregation into the aggregation table 112. As shown, the event data 110 may include individual entries that uniquely correspond to individual ones of the computing events 152. In various implementations, the individual entries may be designated with an "Audit ID" that uniquely identifies the computing event 152 that each entry corresponds to. For illustrative purposes, various details are shown for a range of entries that correspond to Audit ID eighty-three ("83") through Audit ID one-hundred ("100"). In various implementations, the event data 110 may be received by the anomaly detection service 102 on a rolling basis as computing events occur (e.g., individual entries may be received in substantially real-time as corresponding computing events 152 occur). Thus, FIG. 2 illustrates ellipsis both above Audit ID eighty-three ("83") and below Audit ID one-hundred ("100") to indicate that the event data 110 includes additional audit entries that occurred prior to Audit ID eighty-three ("83") and subsequent to Audit ID one-hundred ("100"), respectively. The event data 110 may further include timestamps indicating a precise time at which each individual computing event 152 occurred. For example, as shown in FIG. 2, an individual computing event 152 that corresponds to Audit ID eighty-three ("83") occurred at fifty-seven minutes and fifty-eight milliseconds past the eleventh hour of the current day. Then, another individual computing event 152 that corresponds to Audit ID eighty-four ("84") occurred two ("15") milliseconds later, etc.

As further shown, the event data 110 includes variable columns that uniquely correspond to individual variables for describing the computing events 152. Values for these variables are stored in association with individual audit entries. For example, as shown in FIG. 2, the individual computing event 152 that corresponds to Audit ID eighty-three ("83") corresponds to a download operation (e.g., a user may have deployed a client device 146 to download media content from the business devices 142) that was initiated by a male user (e.g., as indicated by user data 148 associated with a particular client device 146 from which the operation was initiated) from an IP address beginning with "172." (e.g., as indicated by the IP address 150 of the particular client device 146). In the illustrated example, the event data 110 includes N variables where N is a positive integer value (e.g., ten, one-hundred, one-thousand, etc.). It can be appreciated that in various implementations of the techniques disclosed herein, the event data 110 may indicate values for more variables than are actually used by any particular anomaly detection rule 108. That is, various individual rules may have corresponding null subsets of variables.

Turning now to FIG. 3A, illustrated is an exemplary aggregation table 300 that has been constructed in association with a first rule 108(1) and a second rule 108(2). In various implementations, each individual rule 108 includes one or more conditions that indicate values for individual variables of the event data 110.

In the illustrated example, the first rule 108(1) includes a first condition that specifies a value of "download" for the operation variable of the event data 110 and a second condition that specifies a value of "female" for the gender variable of the event data 110. Thus, only computing events 152 that correspond to a female user (e.g., as indicated by user data 148) downloading media content from the business devices 142 may satisfy the conditions of the first rule 108(1). As further illustrated, the first rule 108(1) further includes a user-defined sliding time window of five ("5") minutes ("59"-"55") and an occurrence threshold of ten ("10"). Thus, the first rule 108(1) is designed to trigger an action when ten computing events 152 correspond to female users downloading media content from the business devices 142 within the last five minutes at any particular point in time.

In some implementations, individual rules 108 may define one or more aggregation columns for which the conditions of the individual rules 108 are to be aggregated against. For example, as illustrated, the first rule 108(1) defines an aggregation column of "User ID" to cause the first condition that specifies the value of "download" for the operation variable and the second condition that specifies the value of "female" for the gender variable to be aggregated against. With specific reference to the exemplary aggregation table 300, it can be appreciated that each of the users that correspond to the user IDs of "ID_1234;" "ID_1621;" and "ID_5124" are indicated to be female by the user data 148. In particular, the second condition of the first rule 108(1) filters out individual computing events that do not correspond to female user and, therefore, the user ID's that end up being aggregated into the User ID column are all female users. It can further be appreciated that aggregating the first condition of the first rule 108(1) into the User ID column results in an indication of how many download operations were performed by one or more individual users. Thus, in the specific but nonlimiting example shown in FIG. 3A, aggregation of the event data 110 into the User ID column of the exemplary aggregation table 300 reveals that a female user that corresponds to the user ID "ID_1234" initiated twelve "download" computing events during the specified Sliding Time Window of five ("5") minutes; another female user that corresponds to the user ID "ID_1621" initiated one "download" computing event during the specified Sliding Time Window of five ("5") minutes; and yet another female user that corresponds to the user ID "ID_5124" initiated one "download" computing event during the specified Sliding Time Window of five ("5") minutes.

Also in the illustrated example, the second rule 108(2) includes a first condition that specifies a value of "male" for the gender variable of the event data 110 and a second condition that specifies a value of "Begins with 217" for the IP address variable of the event data 110. Thus, only computing events 152 that correspond to a male user initiating any computing operation in association with the business devices 142 from an IP address that begins with "217" may satisfy the conditions of the second rule 108(2). As further illustrated, the second rule 108(2) further includes a user-defined sliding time window of seven ("7") minutes ("59"-"53") and an occurrence threshold of twenty ("20"). Thus, the second rule 108(2) is designed to trigger an action when twenty computing events 152 correspond to male users interacting with the business devices 142 from IP addresses beginning with "217" within the last seven minutes at any particular point in time. In the illustrated scenario, the second rule 108(2) also defines an aggregation column of "Region" to cause the first condition that specifies the value of "male" for the gender variable and the second condition that specifies the value of "Begins with 217" for the IP address variable to be aggregated against. Thus, with specific reference to the exemplary aggregation table 300, it can be appreciated that aggregation of the event data 110 into the Region column using the conditions specified in the second rule 10(2) reveals that within a region entitled "REG_NA" five ("5") computing events occurred that were initiated by male users from IP addresses that begin with "217," and that in a region entitled "REG_EMEA" six ("6") computing events occurred that were initiated by male users from IP addresses that begin with "217," and furthermore that in a region entitled "REG_APAC" only one ("1") computing event occurred that was initiated by a male user from an IP address that began with "217."

In various implementations, the anomaly detection service 102 generates individual rule rows within the exemplary aggregation table 300 based on each individual rule 108 received from the one or more administrator devices 122. For example, as illustrated, the anomaly detection service 102 has generated individual rule rows 302(1) and 302(2) that uniquely correspond to each of the first rule 108(1) and the second rule 108(2), respectively. The anomaly detection service 102 may analyze each individual rule 108 to determine a corresponding null subset of variables for each individual rule 108. Then, when generating individual rule rows 302 within an aggregation table, the anomaly detection service 102 may set variable values as "null" for those variables for which conditions are not specified. It can be appreciated that setting variable values as "null" may assist the anomaly detection service 102 in omitting "rule-inapplicable" values of the individual computing events 102 from the aggregation table 300. For example, with particular reference to the first rule row 302(1), since the conditions of the first rule 108(1) do not specify values for the "IP address" variable or the "N-th" variable, values for these variables are ignored by the anomaly detection service 102 when analyzing each individual computing event against the first rule row 302(1). Similarly, with particular reference to the second rule row 302(2) that corresponds to the second rule 108(2), values for the "operation" variable and the "N" variable are omitted from the aggregation table 300 since these values are inapplicable to the second rule 108(2).

In various implementations, the anomaly detection service 102 further generates an additional row for each rule to indicate whether any anomalies have been detected in association with those rules. For example, as illustrated, the exemplary aggregation table 300 further includes a "Rule 1 'Agg.'" row that indicates whether any anomalies have been detected in association with the first rule 108(1). Here, because the user that corresponds to the user ID "ID_1234" is a female user that has downloaded more than ten file during the Sliding Time-Window of five minutes, the "Rule 1 'Agg.'" row indicates that an anomaly has been detected in association with this user. In contrast, a "Rule 2 'Agg.'" row that has been created in association with the second rule 108(2) indicates that no individual aggregation values exceed the threshold of the second rule 108(2).

In various implementations, the exemplary aggregation table 300 includes a window identifier ("WindowID") column that identifies one or more particular windows of time into which event data 110 is aggregated. For example, as illustrated, a WindowID column is shown that identifies five ("5") particular windows of consecutive time in association with the first rule 108(1), the summation of which corresponds to the user-defined sliding time window of five ("5") minutes. In particular, the WindowID column includes a range of time windows corresponding to the first rule 108(1) with the most current time window being labeled fifty-nine ("59") and the other time windows spanning back in time in one-minute increments for a total time window of five ("5") minutes. Referring back to FIG. 2, it can be appreciated from the exemplary event data 110 that during the fifty-eight ("58th") minute passed the eleventh hour, five individual computing events 152 occurred that satisfy the conditions of the first rule 108(1). In particular, each of the individual computing events 152 corresponding to audit IDs eighty-five ("85"), eighty-six ("86"), ninety-five ("95"), ninety-seven ("97"), and ninety-eight ("98") satisfy the conditions specified by the first rule 108(1).

The exemplary aggregation table 300 further includes a count column indicating rule satisfaction counts in association with the individual rules and/or individual time windows indicated in the WindowID column. The rule satisfaction counts indicate the specific number of computing events 152 that occur within any individual time window which satisfy the conditions specified by any particular rule 108. For example, as illustrated in association with the first rule 108(1), since five individual computing events 152 occurred during the window of time represented by WindowID fifty-eight ("58"), the rule satisfaction count indicated in association with this time window is five. In various implementations, the exemplary aggregation table 300 may include satisfaction counts in association with at least enough windows of time to account for the user-defined sliding time window for any particular rule. For illustrative purposes, consider a scenario in which each individual WindowID represents a one-minute interval of time (e.g., as shown in the illustrated example). Under these circumstances, the aggregation table 300 may include rule satisfaction counts in association with at least enough of these one-minute time intervals to sum (e.g., add) together to form a complete picture of the user-defined sliding time window. As a more specific but nonlimiting example, in a situation in which each individual WindowID represents a one-minute interval of time and a particular rule specifies a five-minute sliding time window, the anomaly detection service 102 may include rule satisfaction counts within the aggregation table 300 for at least the last (e.g., most recent) five one-minute intervals of time. Similarly, if another rule specifies a seven-minute sliding time window, the anomaly detection service 102 may include rule satisfaction counts within the aggregation table 300 for at least the last (e.g., most recent) seven one-minute intervals of time.

The exemplary aggregation table 300 further includes a threshold column indicating a user-defined occurrence threshold in association with the individual rules 108. For example, as illustrated in FIG. 3A, the first rule row 302(1) indicates the occurrence threshold of ten ("10") defined for the first rule 108(1) whereas the second rule row 302(2) indicates the occurrence threshold of twenty ("20") defined for the second rule 108(2). In some implementations, the anomaly detection service 102 may continually monitor a sum of the rule satisfaction counts for WindowIDs falling within the user-defined sliding time window to determine when the sum of the rule satisfaction counts reaches or exceeds the occurrence threshold for any particular rule. For example, in association with the first rule 108(1), the anomaly detection service 102 may monitor a first sum of the rule satisfaction counts spanning from WindowID fifty-nine ("59") to WindowID fifty-five ("55") since the combination of these five WindowIDs corresponds to the user-defined sliding time window of five minutes. In the illustrated example, the anomaly detection service 102 will determine the sum of these rule satisfaction counts equals fourteen ("14") indicating that fourteen discrete computing events 152 have occurred within the last five minutes that satisfy the conditions specified by the first rule 108(1). Responsive to this determination, the anomaly detection service 102 may perform one or more actions 136 associated with the first rule 108(1). Furthermore, in the illustrated example, the anomaly detection service 102 will determine that the sum of the rule satisfaction counts corresponding to the seven-minute sliding time window of the second rule 108(2) equals thirteen ("13") indicating that thirteen discrete computing events 152 have occurred within the last seven minutes that satisfy the conditions specified by the second rule 108(2). Accordingly, the anomaly detection service 102 may determine that the second rule 108(2) has not been triggered and therefore may refrain from performing one or more actions 136 associated with the second rule 108(2).

It can be appreciated that by identifying the null subsets of variables for the individual rules and omitting corresponding "rule-inapplicable" values from the aggregation table on a rule-by-rule basis, the disclosed techniques greatly reduce the computing resources consumed during aggregation as compared to existing anomaly detection systems which generate separate aggregation tables for each individual rule. Furthermore, since the disclosed techniques do not generate a large number of relatively sparse aggregation tables but rather generate a single comprehensive aggregation table that is used for all rules, the disclosed greatly improve the efficiency with which the aggregated data is stored (e.g., storing the data in a single tables results in less data fragmentation than storing the data across numerous relatively sparse tables).

Turning now to FIG. 3B, illustrated is an exemplary aggregation table 350 that has been constructed in association with the first rule 108(1) and the second rule 108(2) of FIG. 3A wherein the user-defined sliding time windows have been converted to a common sliding time window of fixed length. In the illustrated example, each of the five-minute sliding time window of the first rule 108(1) and the seven-minute sliding time window of the second rule 108(2) have been converted to one day (i.e., one-thousand four-hundred and forty ("1440") minutes). By converting the varying sliding time windows into a common sliding time window, the described techniques enable the anomaly detection system 102 to leverage built-in support of various computing platforms (e.g., APACHE SPARK, etc.) and mitigate the need to further develop custom code associated with enabling users to define custom sliding time windows.

In various implementations, converting the user-defined sliding time windows into the common sliding time window of fixed length includes scaling the timestamp associated with each individual computing event based on a predetermined scaling factor. The predetermined scaling factor may correspond to the fixed length of the common sliding time window. For example, in the illustrated scenario, an exemplary predetermined scaling factor may be one-thousand four-hundred and forty ("1440") minutes (e.g., the length of the common sliding time window in the same units of measurement as the user-defined sliding time windows). In plain terms, the techniques described in relation to FIG. 3B are based on scaling the timestamps received in the stream of the event data 110 based on the observation that given two computing events that occur at T1 and T2, respectively: if |T1−T2| is less than the sliding window length for any particular rule, then |c× T1−c×T2| must be less than c times that sliding window length so long as c is a constant real number. Thus, if two event entries fall within the same sliding time window, they will still fall within the same sliding time window after the timestamp for those two event entries are scaled and the sliding window length is also scaled by the same constant ratio.

For illustrative purposes, consider a scenario in which it is desirable to convert all sliding time windows to be the same length of one day. Here, the anomaly detection service 102 may generate the exemplary aggregation table 350 after generating the exemplary aggregation table 300 as an intermediate result. In particular, in generating the "intermediate" aggregation table 300, the anomaly detection service 102 pre-aggregates the event data for every one-minute increment of time (or any other suitable increment of time for that matter). Then, from this "intermediate" aggregation table 300, the anomaly detection service 102 may add a column for a scaled (e.g., normalized) WindowID to store values representing the WindowID for any particular one-minute increment of time multiplied by a predetermined scaling factor. For example, the values within the normalized WindowID column(s) may be generated based on the following equation:

$$WindowID * \frac{scaling\ factor}{Sliding\ TimeWindow\ Length} \quad (Eq.\ 1)$$

wherein the scaling factor corresponds to the length of the desired common sliding time window. For example, as illustrated in FIG. 3B, WindowID fifty-nine ("59") may be normalized in association with the first rule 108(1) based on the following equation:

$$59 * \frac{1440\ minutes}{5\ minutes} \quad (Eq.\ 2)$$

since the desired common sliding time window is equal to one-thousand four-hundred and forty ("1440") minutes and the sliding time window length for the first rule 108(1) is equal to five ("5") minutes. After normalizing each of the windowIDs in association with the individual rules, the anomaly detection service 102 may normalize the timestamps of the event data 110 in association with the individual rules and then may aggregate the event data 110 directly into the aggregation table 350 based on the normalized timestamps. Various existing aggregation platforms such as, for example, APACHE SPARK are capable of directly supporting the forgoing novel aggregation techniques based on the exemplary aggregation code as follows:
    import org.apache.spark.sql.expressions.Window
    val windowSpec=Window.partitionBy('RuleId').orderBy ('ScaledWindowID', 'WindowID').rangeBetween(0, 1440)
    val result=OneMinuteAggregation.withColumn("Count", sum('Count') over windowSpec)

The forgoing exemplary aggregation code will produce a resulting table with a rule ID column, a WindowID column, a normalized WindowID column, and a count column as illustrated in FIG. 3B. It should be appreciated from the foregoing discussion of FIG. 3B that because both the WindowIDs and the timestamps are commensurately scaled, the rule satisfaction counts and the threshold occurrences remain identical between the exemplary aggregation tables 300 and 350.

Figure 4:
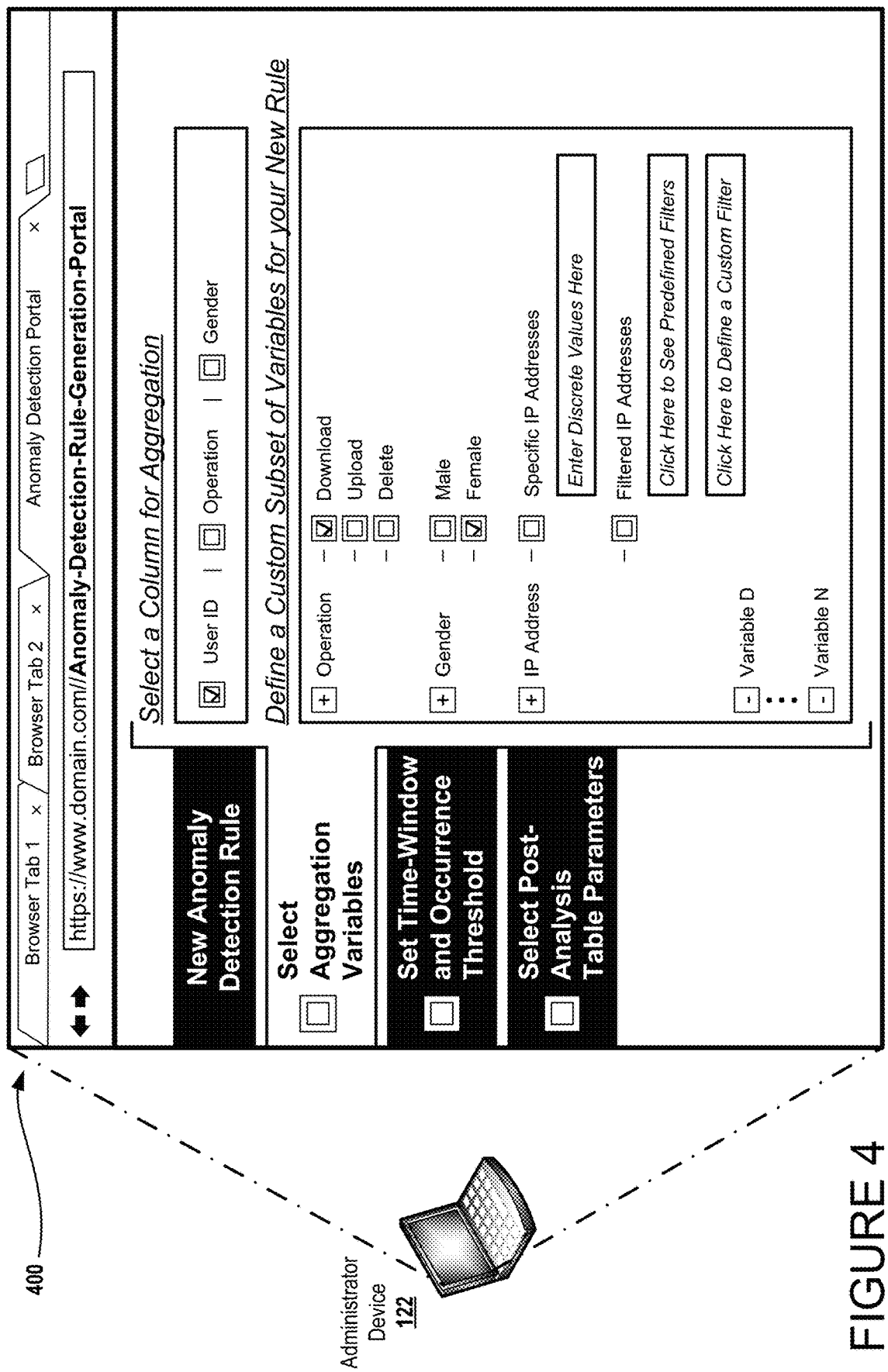
FIG. 4 illustrates an exemplary rule-generation graphical user interface (GUI) that enables users to define variable subsets and corresponding values.

Turning now to FIG. 4, aspects are illustrated of an exemplary rule-generation graphical user interface (GUI) 400 that enables users to define variable subsets 128 and corresponding values 130. In the illustrated scenario, a user has specified the conditions corresponding to the first rule 108(1) described in relation to FIGS. 3A and 3B. In particular, the user has selected a value of "download" for the operation variable of the event data 110 and a value of "female" for the gender variable of the event data 110.

In various implementations, the exemplary rule-generation GUI 400 further enables users to select one or more columns to aggregate data in association with a particular rule. In the illustrated scenario, a user has specified the aggregation column corresponding to the first rule 108(1) described in relation to FIGS. 3A and 3B. In particular, the user has selected the "User ID" column to cause the conditions specified in association with the first rule 108(1) to be aggregated with respect to the "User ID" column as shown and described with relation to FIGS. 3A through 3B.

Referring specifically to the operation variable and the gender variable, in some implementations the rule-generation GUI 400 may be configured to automatically list all possible values for any particular variable to communicate those possible values to the user. For example, as illustrated, the rule-generation GUI 400 has automatically listed out the two possible values for the gender variable (e.g., both the male value and the female value are displayed along with corresponding checkboxes).

Referring specifically to the IP address variable, in some implementations the rule-generation GUI 400 may be configured to enable the user to specifically define values for any particular variable. For example, as illustrated, the rule-generation GUI 400 provides the user with the option to specify one or more specific IP addresses by entering discrete values for IP addresses within a user entry field (e.g., shown with the text "Enter Discrete Values Here" displayed therein). Furthermore, in some implementations the rule-generation GUI may be configured to enable users to define values for one or more variables based on filter parameters rather than discrete values. For example, as illustrated, the rule-generation GUI 400 provides the user with the option to specify filter parameters in association with the IP address variable. As further illustrated, in some implementations the rule-generation GUI 400 may provide the user with the option to view and select one or more predefined filters. As a specific but nonlimiting example, the rule-generation GUI 400 may provide the user with the ability to select a predefined "European IP Address" filter parameter that returns computing events originating from any European IP address (e.g., any IP address beginning with "217.", "81.", or "62."). As further illustrated, in some implementations the rule-generation GUI 400 may provide the user with the option to manually define one or more custom filter parameters for aggregating the event data 110 into the aggregation table 112.

In the specific example illustrated in FIG. 4, since the user has refrained from specifying values for the IP address variable as well as variables "D" through "N," the anomaly detection service 102 may determine these variables to be part of a null subset of variables corresponding to this particular rule.

Figure 5:
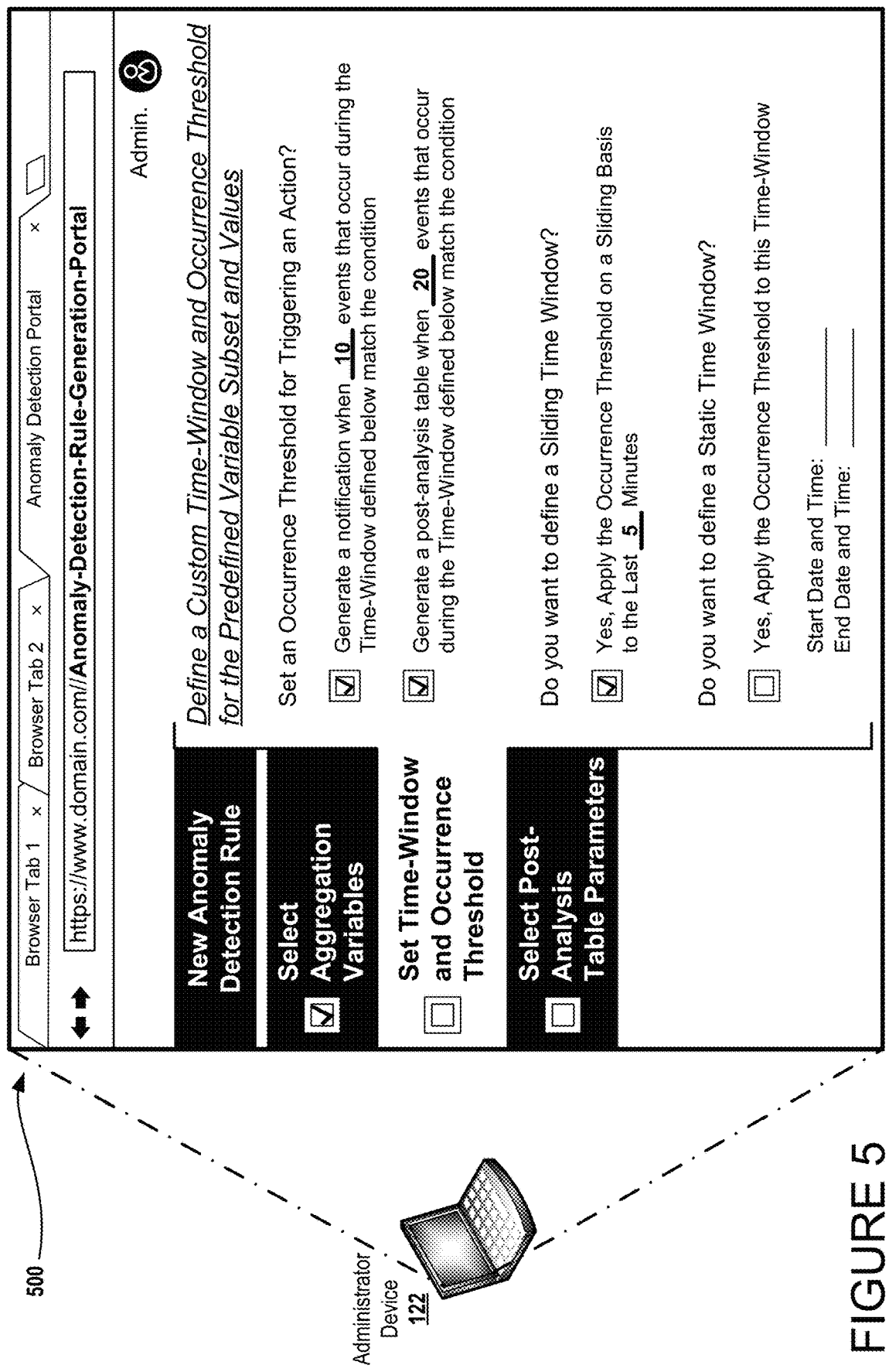
FIG. 5 illustrates an exemplary rule-generation GUI that enables users to define custom time windows and/or occurrence thresholds for individual rules.

Turning now to FIG. 5, aspects are illustrated of an exemplary rule-generation GUI 500 that enables users to define custom time windows and/or occurrence thresholds for individual rules 108. In the illustrated scenario, a user has specified the occurrence threshold and sliding time window corresponding to the first rule 108(1) described in relation to FIGS. 3A and 3B. In particular, the user-defined an occurrence threshold of ten ("10") occurrences for generating a notification 138 and a sliding time window of five ("5") minutes.

In some implementations, the rule-generation GUI 500 may enable the user to define different occurrence thresholds and/or time windows for different user-defined actions. In the illustrated scenario, the user has specified an occurrence threshold of ten ("10") in association with generating the notification 138 but has further specified an occurrence threshold of twenty ("20") in association with generating the post-analysis table 140.

In some implementations, the rule-generation GUI 500 may enable the user to select between defining a sliding time window in association with a particular rule or defining a static time window in association with a particular rule. As indicated above, in the illustrated scenario the user has selected a sliding time window of five ("5") minutes. However, as further illustrated, the user could have chosen to define a static time window based on a specific "Start Date and Time" and a specific "End Date and Time." For example, the user may be interested in computing events 152 surrounding a particular time range of interest (e.g., the popular shopping holiday colloquially referred to as "Black Friday") for any range of reasons. Accordingly, the user may define anomaly detection rules 108 that specifically correspond to any particular time range of interest.

Figure 6:
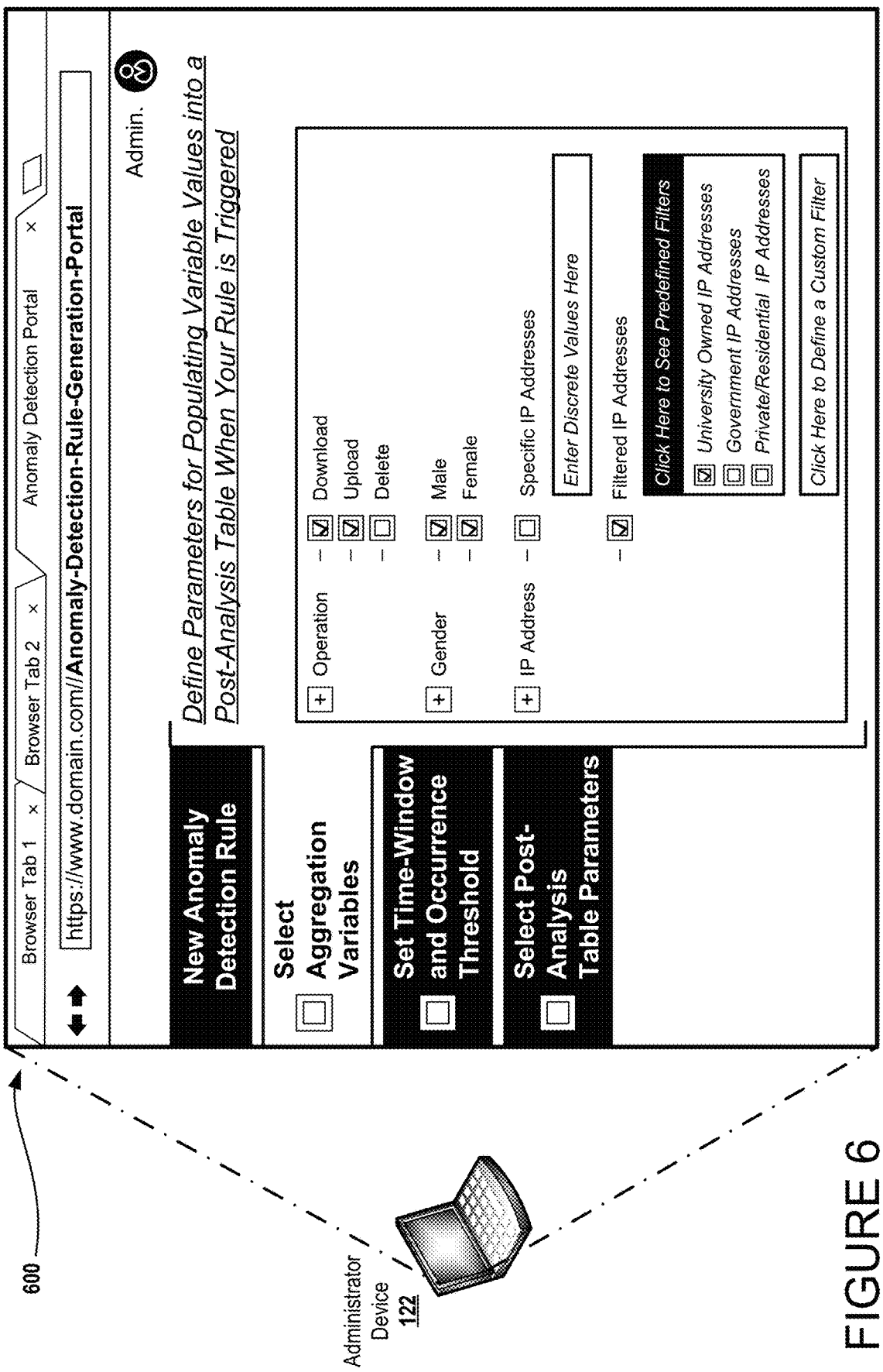
FIG. 6 illustrates an exemplary rule-generation GUI that enables users to manually define one or more variable values to populate into a post-analysis table upon a particular rule being satisfied.

Turning now to FIG. 6, aspects are illustrated of an exemplary rule-generation GUI 600 that enables users to manually define one or more variable values to populate into a post-analysis table 140 upon a particular rule being satisfied. In the illustrated scenario, a user has selected for the operation variable both a download value and an upload value, but has not selected a delete value. Thus, upon the first rule 108(1) being satisfied, the anomaly detection service 102 may generate a post-analysis table 140 by populating into an operation column values for all computing events 152 having a value of download or a value of upload for the operation variable within the event data 110.

As described briefly with respect to the rule generation GUI 400, the rule generation GUI 600 may also enable the user to define "filter" parameters 118 for the post-analysis table generator 116 to utilize when populating values into the post-analysis table 140. In particular, the rule generation GUI 600 provides the user with the option to view and/or select one or more predefined filters and/or to define one or more custom filters for use in generating the post-analysis table 140. In the specific but nonlimiting example illustrated in FIG. 6, the user has provided the option to instruct the anomaly detection service 102 to preemptively populate an IP address column of the post-analysis table 140 with any IP address value that is determined to be a "University Owned IP Address," a "Government IP Address," and/or a "Private/Residential IP Address."

Figure 7:
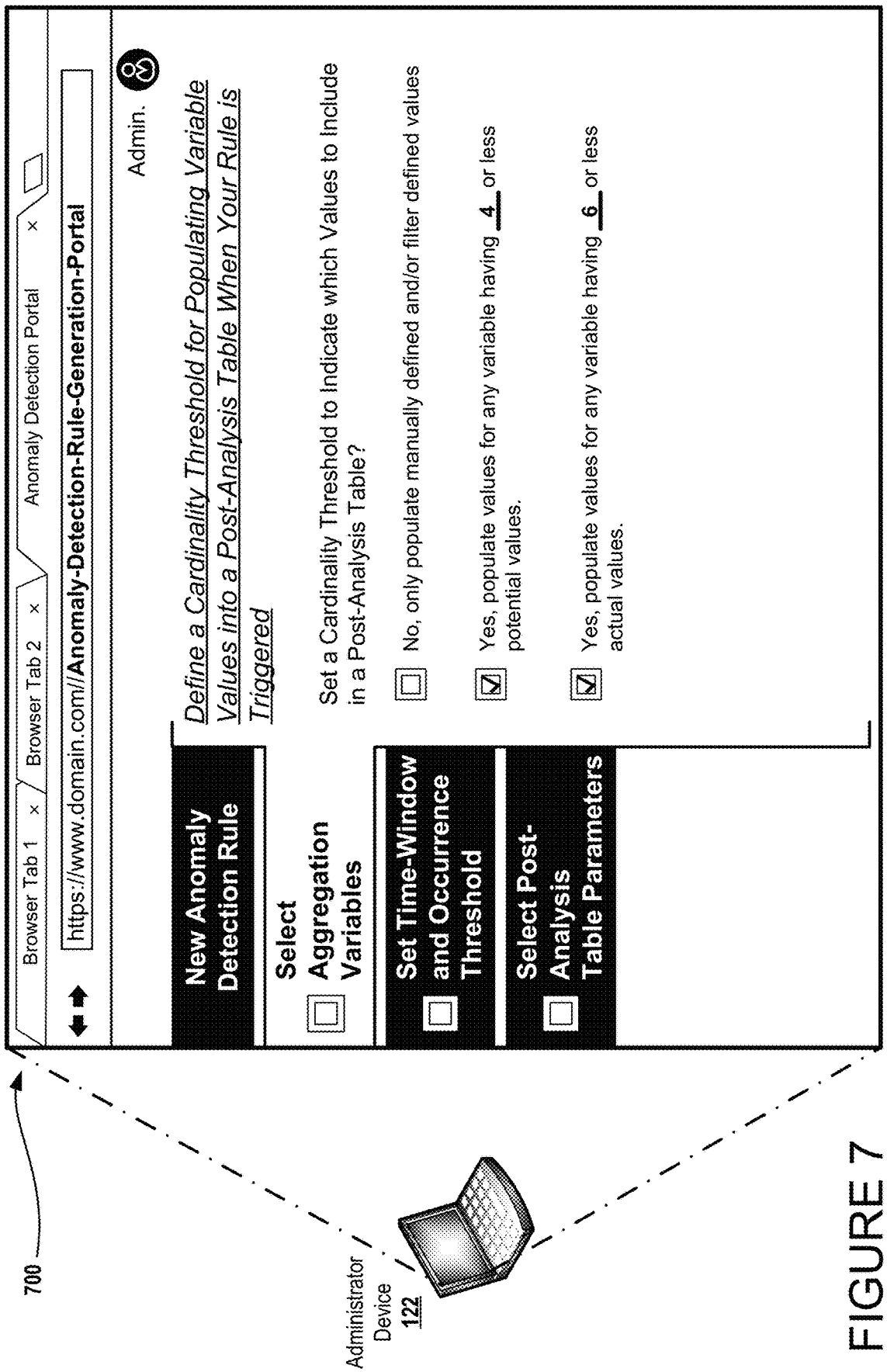
FIG. 7 illustrates an exemplary rule generation GUI that enables users to define cardinality thresholds that are usable to determine which variables to populate into a post-analysis table upon a particular rule being satisfied.

Turning now to FIG. 7, aspects are illustrated of an exemplary rule generation GUI 700 that enables users to define cardinality thresholds that are usable to determine which variables to populate into a post-analysis table 140 upon a particular rule being satisfied. As described above, the term "cardinality threshold" may generally refer to a cardinality level that indicates which variables of a particular aggregation table 112 are to have values preemptively populated into a post-analysis table 140. For example, embodiments described herein may identify variables having a cardinality below a cardinality threshold and populate values thereof into the post-analysis table without those values being explicitly requested after generation of the post-analysis table 140. It can be appreciated that pre-populating certain variables into a post-analysis table 140 preemptively, rather than waiting for a user to receive the post-analysis table 140 that is missing values for certain variables, mitigates network bandwidth usage associated with the user continually requesting new data fields be populated into the post-analysis table 140.

In the illustrated scenario, a user has selected a cardinality threshold of four ("4") in association with potential values for any particular variable. Thus, when generating the post-analysis table 140, the post-analysis table generator 116 may preemptively populate the post-analysis table 140 with values for any variable columns in which the corresponding variable has four or less potential values. As a specific but nonlimiting example, because the gender variable described herein includes only two potential values (i.e., a male value and a female value), the gender variable column of the post-analysis table 140 may be preemptively populated with values for the gender variable for all computing events 152 falling within the particular time window in which the rule is triggered.

In the illustrated scenario, a user has also selected a cardinality threshold of six ("6") in association with actual values for any particular variable. Thus, when generating the post-analysis table 140, the post-analysis table generator 116 may preemptively populate the post-analysis table 140 with values for any variable columns in which the computing events 152 occurring during the particular time window in which the rule is triggered collectively have six or less actual values. As a specific but nonlimiting example, consider that the IP address variable described herein has a practically limitless number of potential values. Suppose that during the particular time window in which a rule has been triggered, one-hundred discrete computing events 152 took place and that each one of these discrete computing events was initiated from the same IP address. Under these circumstances, the actual values for the IP address variable within the particular time window in which the rule is triggered correspond to a cardinality of one ("1"). Under these specific but nonlimiting circumstances, the user having selected the cardinality threshold of six ("6") in association with actual values for any particular variable as illustrated in FIG. 7 would result in the IP address variable column of the post-analysis table 140 being preemptively populated with values for the IP address variable for all computing events 152 falling within the particular time window in which the rule was triggered.

Figure 8:
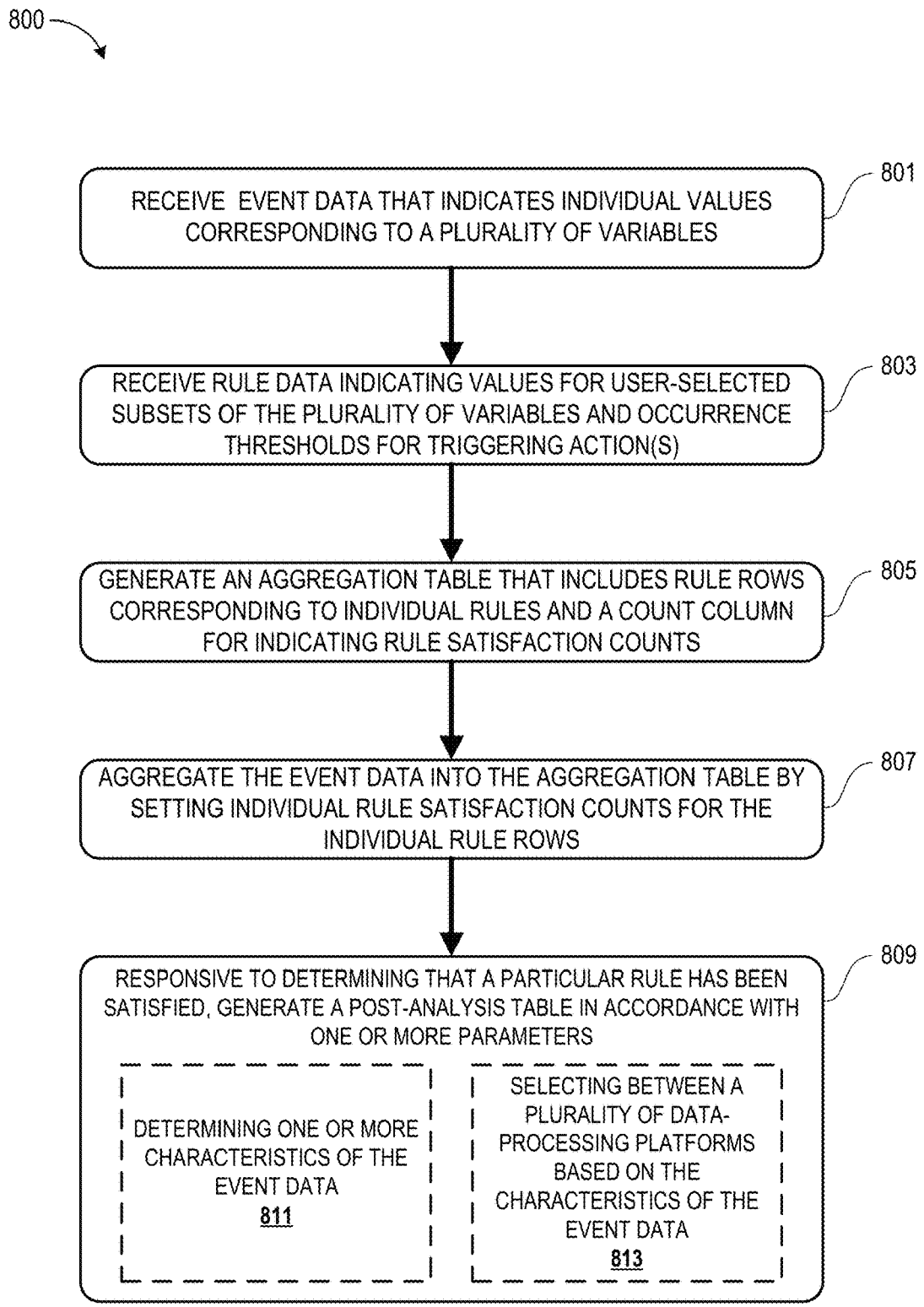
FIG. 8 is a flow diagram of an example method for aggregating event data into an aggregation table based on user-defined subsets of multiple variable columns within the aggregation table and generating a post-analysis table in response to a particular rule being satisfied.

FIG. 8 is a flow diagram of an example method 800 for aggregating event data into an aggregation table based on user-defined subsets of multiple variable columns within the aggregation table and generating a post-analysis table in response to a particular rule being satisfied. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 801, an anomaly detection service 102 may receive event data 110 that indicates for individual computing events 152, individual values corresponding to a plurality of variables. As described above, exemplary variables include but are not limited to an "operation" variable, a "gender" variable, and/or an "IP address" variable. Thus, the event data 110 may indicate for individual computing events 152, a type of operation performed, a gender of a user having initiated an operation, and/or an IP address from which a computing event 152 was initiated.

At block 803, the anomaly detection service 102 may receive rule data that defines a plurality of anomaly detection rules (also referred to herein as simply "rules"). The individual rules may indicate user-selected subset(s) 128 of the plurality of variables of the event data 110 and may further indicate user-specified values 130 for the user-selected subset(s) 128. The individual rules may further indicate occurrence thresholds 134 and user-defined sliding time windows 132 for the occurrence thresholds 134 to be applied against.

At block 805, the anomaly detection service 102 may generate an aggregation table that includes rule rows 302, that correspond to individual rules 108, to facilitate aggregation of the event data 110. The aggregation table may include individual variable columns that uniquely correspond to individual variables of the plurality of variables of the event data 110. In some implementations, the anomaly detection service 102 may analyze the rule data to determine individual null subsets of variables and, ultimately, to mark variables that correspond to these null subsets as "null" within individual rule rows 302. In this way, when aggregating the event data 110 into an individual rule row, the anomaly detection service 102 may ignore variables marked as "null." The aggregation table may further include a count column for indicating rule satisfaction counts in association with the individual rules as a stream of the event data 110 is continuously aggregated into the aggregation table in substantially real-time.

At block 807, the anomaly detection service 102 may aggregated the event data 110 into the aggregation table by analyzing portions of the event data 110 that correspond to individual computing events 152 against the individual rule rows 302. As individual computing events 152 satisfy conditions of individual rules 108, the anomaly detection service 102 may increment rule satisfaction counts for the individual rules 108.

At block 809, the anomaly detection service 102 may generate a post-analysis table 140 in response to determining that a particular rule has been satisfied. The post-analysis table 140 may be generated in accordance with one or more parameters which in some instances may be defined by a user prior to the particular rule having been satisfied. For example, the user may generate a particular rule 108 that contain one or more parameters such as, for example, a cardinality threshold and/or filter parameters prior to the anomaly detection service 102 deploying the particular rule. Then, the anomaly detection service 102 may transmit a notification to the user to inform the user that an anomaly has occurred and/or to provide access to the post-analysis table 140.

In some implementations, generating the post-analysis table 140 may include determining one or more characteristics of the event data 110 at block 811. For example, the anomaly detection service 102 may analyze the event data 110 to determine a size of the data set to be used to generate the post-analysis table 140 (e.g., the data set that contemporaneously surrounds the detected anomaly). Then, at block 813, the anomaly detection service 102 may select between a plurality of data processing platforms 120 based on the one or more characteristics of the event data determined at block 811. For example, in response to determining that the data set is too large to be efficiently and/or accurately parsed and/or compiled by a first data processing platform 120(1), the anomaly detection service 102 may instead select an alternate data processing platform to generate the post-analysis table 140. As a more specific but nonlimiting example, the first data processing platform 120(1) may be a relational database management system (e.g., ORACLE DATABASE, MySQL by ORACLE CORPORATION, etc.) which is ill-suited to parse extremely large data sets whereas the alternate data processing platform may be a MapReduce system (e.g., APACHE HADOOP, etc.) that, despite being relatively slower than the relational database management system (e.g., due to requiring individual jobs to be scheduled in advance), is relatively better suited to parse extremely large data sets and produce accurate results. Under this specific but nonlimiting example, in response to the size of the data set exceeding a threshold data size and/or threshold data complexity, the anomaly detection service 102 may select the MapReduce system over the relational database management system. In contrast, if the size of the data set is below the threshold data size and/or threshold data complexity, the anomaly detection service may instead select the relational database management system over the MapReduce system to provide the user with information as soon as possible.

Figure 9:
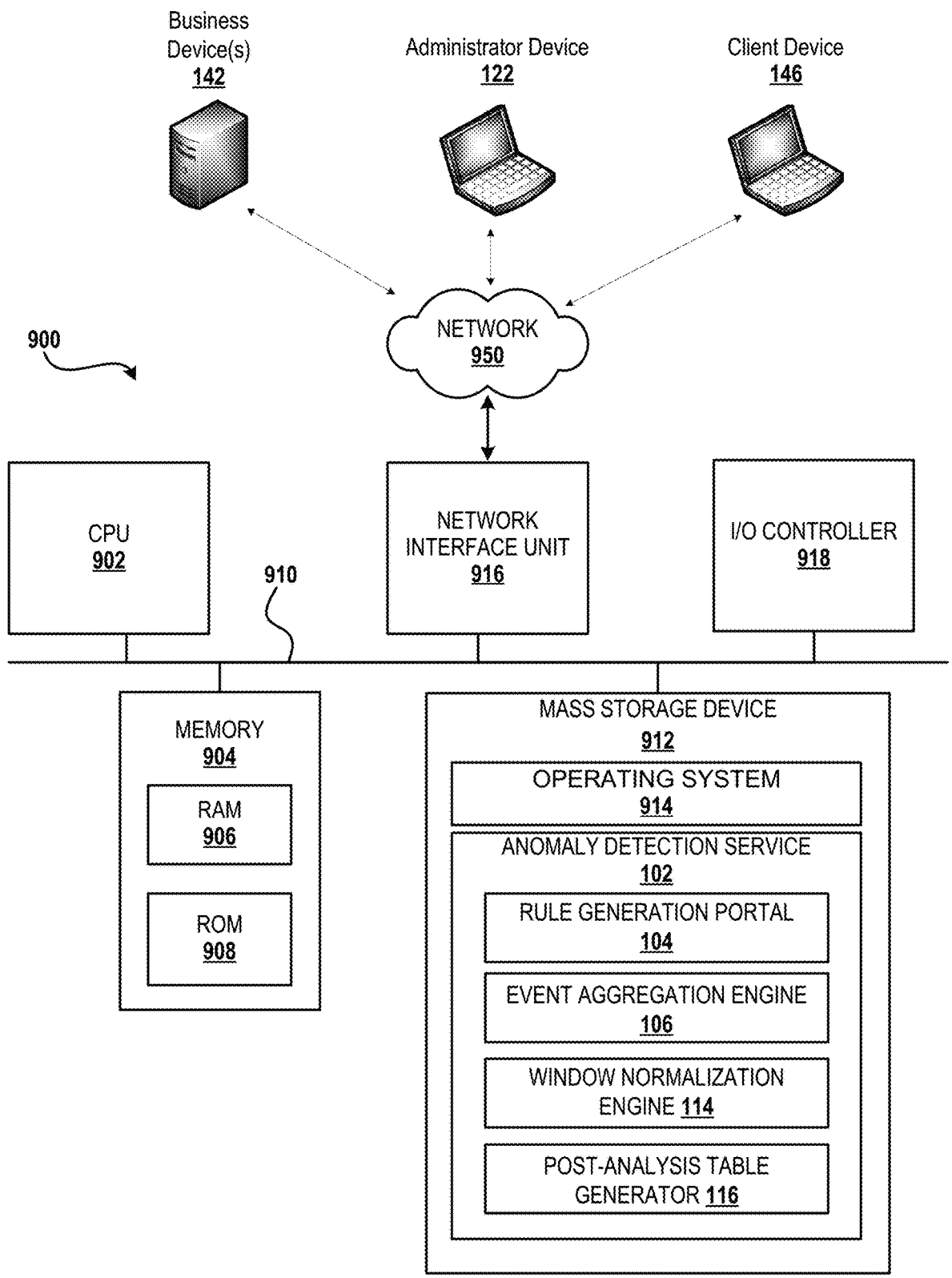
FIG. 9 shows additional details of an example computer architecture for a computer capable of executing the anomaly detection service and/or any program components thereof as described herein.

FIG. 9 shows additional details of an example computer architecture 900 for a computer capable of executing the anomaly detection service 102 and/or any program components thereof as described herein. Thus, the computer architecture 900 illustrated in FIG. 9 illustrates an architecture for a server computer, or network of server computers, or any other types of computing devices suitable for implementing the functionality described herein. The computer architecture 900 may be utilized to execute any aspects of the software components presented herein.

The computer architecture 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 914, other data, and one or more application programs. The mass storage device 912 may further include one or more of the anomaly detection service 102, rule generation portal 104, event aggregation engine 106, window normalization engine 114, and/or post analysis table generator 116.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data.

For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various techniques, the computer architecture 900 may operate in a networked environment using logical connections to remote computers through a network 950 and/or another network (not shown). The computer architecture 900 may connect to the network 950 through a network interface unit 916 connected to the bus 910. It should be appreciated that the network interface unit 916 also may be utilized to connect to other types of networks and remote computer systems. The computer architecture 900 also may include an input/output controller 918 for receiving and processing input from a number of other devices, including a keyboard, mouse, or electronic stylus (not shown in FIG. 9). Similarly, the input/output controller 918 may provide output to a display screen, a printer, or other type of output device (also not shown in FIG. 9). It should also be appreciated that via a connection to the network 950 through a network interface unit 916, the computing architecture may enable the anomaly detection service 102 to communicate with one or more of the business devices 142, administrator device 122, and/or client device 146.

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Example Clauses

The disclosure presented herein may be considered in view of the following clauses.

Example Clause A, a computer-implemented method for reducing computational resources for performing anomaly detection, the method comprising: receiving event data that indicates for individual events, of a plurality of events, individual values corresponding to a plurality of variables; receiving rule data defining rules for triggering at least one predefined action, wherein individual rules indicate individual occurrence thresholds associated with predefined values for user-selected subsets of the plurality of variables; generating an aggregation table that includes at least: individual variable columns corresponding to individual variables of the plurality of variables, individual rule rows corresponding to the individual rules, and a count column for indicating rule satisfaction counts in association with the individual rules; analyzing the rule data to determine individual null subsets, of the plurality of variables, that correspond to the individual rules; aggregating the event data into the aggregation table by setting individual rule satisfaction counts for the individual rule rows based on the individual values, for individual events, matching the predefined values for the user-selected subsets of the plurality of variables, wherein the individual rule rows omit rule-inapplicable values associated with the individual null subsets that uniquely correspond to the individual rule rows; and causing performance of the at least one predefined action responsive to at least one particular rule satisfaction count, that corresponds to a particular rule, satisfying a particular occurrence threshold.

Example Clause B, the computer-implemented method of Example Clause A, wherein the aggregation table further includes a window identifier column for indicating a plurality of time-ranges in association with the particular rule, and wherein the count column indicates the individual rule satisfaction counts for the particular rule during individual time-ranges of the plurality of time-ranges.

Example Clause C, the computer-implemented method of Example Clause B, wherein the rule data further defines at least a first sliding time window that corresponds to a first rule and a second sliding time window that corresponds to a second rule, and wherein the first sliding time window and the second sliding time window are normalized, within the aggregation table, to a common sliding time window based at least in part on a predetermined scaling factor.

Example Clause D, the computer-implemented method of any one of Example Clauses A through C, wherein the at least one predefined action includes generating a notification that indicates that the at least one particular rule satisfaction count, that corresponds to the particular rule, has satisfied the particular occurrence threshold.

Example Clause E, the computer-implemented method of any one of Example Clauses A through D, wherein the at least one predefined action includes generating a post-analysis table, in association with the particular rule, that is preemptively populated with a first plurality of the individual values that correspond to a first variable having a first cardinality that is less than a cardinality threshold and that omits a second plurality of the individual values that correspond to a second variable having a second cardinality that is greater than the cardinality threshold.

Example Clause F, the computer-implemented method of any one of Example Clauses A through E, wherein the at least one predefined action includes generating a post-analysis table, in association with the particular rule, that is preemptively populated with a first plurality of the individual values that satisfy one or more filter parameters and that omits a second plurality of the individual values that does not satisfy the one or more filter parameters.

Example Clause G, the computer-implemented method of any one of Example Clauses A through F, further comprising: determining one or more characteristics of the event data to select between a plurality of data-processing platforms for generating a post-analysis table; and deploying a selected data-processing platform to parse the event data to generate the post-analysis table.

Example Clause H, the computer-implemented method of Example Clause G, wherein the selected data-processing platform includes at least one of: a relational database management system, a non-relational database management system, or a MapReduce system, Example Clause I, a system for implementing anomaly detection rules, comprising: at least one processor; and at least one memory in communication with the at least one processor, the at least one memory having computer-readable instructions stored thereupon that, when executed by the at least one processor, cause the at least one processor to: cause a device to display a rule-generation graphical user interface (GUI) that enables at least one user to: define an anomaly detection rule that associates an occurrence threshold with predefined values for a user-selected subset of a plurality of variables that correspond to an aggregation table; and set one or more parameters for generating a post-analysis table in association with the anomaly detection rule; generate, within the aggregation table, an individual rule row that corresponds to the anomaly detection rule, wherein the individual rule row indicates the predefined values for the user-selected subset of the plurality of variables, and wherein the individual rule row indicates a null subset of the plurality of variables; receive event data that indicates for individual events, of a plurality of events, individual values corresponding to at least some of the plurality of variables; aggregate the event data into the aggregation table by setting a rule satisfaction count, for the individual rule row, when the individual values match the predefined values; and responsive to a determination that the rule satisfaction count exceeds the occurrence threshold during a time window, generate the post-analysis table in accordance with the one or more parameters; and generate a notification that indicates that the rule satisfaction count exceeded the occurrence threshold during the time window, wherein the notification indicates an availability of the post-analysis table to the at least one user.

Example Clause J, the system of Example Clause I, wherein the one or more parameters for generating the post-analysis table include a cardinality threshold that causes the at least one processor to: identify a first variable, of the plurality of variables, having a first cardinality that is less than the cardinality threshold; identify a second variable, of the plurality of variables, having a second cardinality that is greater than the cardinality threshold; populate the post-analysis table with a first plurality of the individual values that correspond to the first variable; and refrain from populating the post-analysis table with a second plurality of the individual values that correspond to the second variable.

Example Clause K, the system of any one of Example Clauses I through J, wherein the one or more parameters for generating the post-analysis table include one or more filter parameters that cause the at least one processor to: populate the post-analysis table with a first plurality of the individual values that satisfy the one or more filter parameters; and refrain from populating the post-analysis table with a second plurality of the individual values that does not satisfy the one or more filter parameters.

Example Clause L, the system of any one of Example Clauses I through K, wherein the rule-generation GUI further enables the at least one user to set a user-defined sliding time window for the anomaly detection rule.

Example Clause M, the system of Example Clause L, wherein the time window of the aggregation table is a common sliding time window, and wherein the computer-readable instructions further cause the at least one processor to: convert the user-defined sliding time window into the common sliding time window based at least in part on a predetermined scaling factor.

Example Clause N, the system of Example Clause I, wherein the rule-generation GUI further enables the at least one user to define an aggregation column to associate with the user-defined sliding time window for the anomaly detection rule.

Example Clause O, the system of Example Clause I, wherein the computer-readable instructions further cause the at least one processor to: aggregate the event data into the aggregation table by setting a plurality of rule satisfaction counts, for a plurality of individual rule rows that correspond to the anomaly detection rule, based on the individual values matching the predefined values during individual time-ranges associated with the ones of the plurality of individual rule rows; and generate a sliding summation of at least some of the plurality of rule satisfaction counts to determine when the sliding summation exceeds the occurrence threshold during the user-defined sliding time window.

Example Clause P, the system of any one of Example Clauses I through O, wherein the computer-readable instructions further cause the at least one processor to select between a plurality of data-processing platforms for generating the post-analysis table based on one or more characteristics of the event data.

Example Clause Q, the system of any one of Example Clauses I through P, wherein generating the post-analysis table in accordance with the one or more parameters includes preemptively populating the post-analysis table with a set of the individual values that correspond to a particular variable that is within the null subset of the plurality of variables Example Clause R, a computer-implemented method, comprising: causing a device to display a rule-generation graphical user interface (GUI) that enables at least one user to define an anomaly detection rule and to one or more parameters for generating a post-analysis table in association with the anomaly detection rule; generating an aggregation table that includes an individual rule row that corresponds to the anomaly detection rule, wherein the individual rule row indicates the predefined values for a user-selected subset of a plurality of variables; receiving event data that indicates for individual events, of a plurality of events, individual values corresponding to at least some of the plurality of variables; aggregate the event data into the aggregation table by setting a rule satisfaction count for the individual rule row; and generating the post-analysis table in accordance with the one or more parameters responsive to a determination that the rule satisfaction count exceeds an occurrence threshold.

Example Clause S, the computer-implemented method of Example Clause R, wherein the one or more parameters for generating the post-analysis table include a cardinality threshold.

Example Clause T, the computer-implemented method of Example Clause R, wherein the one or more parameters for generating the post-analysis table include one or more filter parameters.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for reducing computational resources for performing anomaly detection, the method comprising:
   receiving event data that indicates for individual events, of a plurality of events, individual values corresponding to a plurality of variables;
   receiving rule data defining rules for triggering at least one predefined action, wherein individual rules indicate individual occurrence thresholds associated with predefined values for user-selected subsets of the plurality of variables;
   generating an aggregation table that includes at least:
      individual variable columns corresponding to individual variables of the plurality of variables,
      individual rule rows corresponding to the individual rules, and
      a count column for indicating rule satisfaction counts in association with the individual rules;
   analyzing the rule data to determine individual null subsets, of the plurality of variables, that correspond to the individual rules;
   aggregating the event data into the aggregation table by setting individual rule satisfaction counts for the individual rule rows based on the individual values, for individual events, matching the predefined values for the user-selected subsets of the plurality of variables, wherein the individual rule rows omit rule-inapplicable values associated with the individual null subsets that uniquely correspond to the individual rule rows; and
   causing performance of the at least one predefined action responsive to at least one particular rule satisfaction count, that corresponds to a particular rule, satisfying a particular occurrence threshold.

2. The computer-implemented method of claim 1, wherein the aggregation table further includes a window identifier column for indicating a plurality of time-ranges in association with the particular rule, and wherein the count column indicates the individual rule satisfaction counts for the particular rule during individual time-ranges of the plurality of time-ranges.

3. The computer-implemented method of claim 2, wherein the rule data further defines at least a first sliding time window that corresponds to a first rule and a second sliding time window that corresponds to a second rule, and wherein the first sliding time window and the second sliding time window are normalized, within the aggregation table, to a common sliding time window based at least in part on a predetermined scaling factor.

4. The computer-implemented method of claim 1, wherein the at least one predefined action includes generating a notification that indicates that the at least one particular rule satisfaction count, that corresponds to the particular rule, has satisfied the particular occurrence threshold.

5. The computer-implemented method of claim 1, wherein the at least one predefined action includes generating a post-analysis table, in association with the particular rule, that is preemptively populated with a first plurality of the individual values that correspond to a first variable having a first cardinality that is less than a cardinality threshold and that omits a second plurality of the individual values that correspond to a second variable having a second cardinality that is greater than the cardinality threshold.

6. The computer-implemented method of claim 1, wherein the at least one predefined action includes generating a post-analysis table, in association with the particular rule, that is preemptively populated with a first plurality of the individual values that satisfy one or more filter parameters and that omits a second plurality of the individual values that does not satisfy the one or more filter parameters.

7. The computer-implemented method of claim 1, further comprising:
   determining one or more characteristics of the event data to select between a plurality of data-processing platforms for generating a post-analysis table; and
   deploying a selected data-processing platform to parse the event data to generate the post-analysis table.

8. The computer-implemented method of claim 7, wherein the selected data-processing platform includes at least one of: a relational database management system, a non-relational database management system, or a MapReduce system.

9. A system for implementing anomaly detection rules, comprising:
   at least one processor; and
   at least one memory in communication with the at least one processor, the at least one memory having computer-readable instructions stored thereupon that, when executed by the at least one processor, cause the at least one processor to:
      cause a device to display a rule-generation graphical user interface (GUI) that enables at least one user to:
         define an anomaly detection rule that associates an occurrence threshold with predefined values for a user-selected subset of a plurality of variables that correspond to an aggregation table; and set one or more parameters for generating a post-analysis table in association with the anomaly detection rule;

generate, within the aggregation table, an individual rule row that corresponds to the anomaly detection rule, wherein the individual rule row indicates the predefined values for the user-selected subset of the plurality of variables, and wherein the individual rule row indicates a null subset of the plurality of variables;

receive event data that indicates for individual events, of a plurality of events, individual values corresponding to at least some of the plurality of variables;

aggregate the event data into the aggregation table by setting a rule satisfaction count, for the individual rule row, when the individual values match the predefined values; and responsive to a determination that the rule satisfaction count exceeds the occurrence threshold during a time window, generate the post-analysis table in accordance with the one or more parameters; and generate a notification that indicates that the rule satisfaction count exceeded the occurrence threshold during the time window, wherein the notification indicates an availability of the post-analysis table to the at least one user.

10. The system of claim 9, wherein the one or more parameters for generating the post-analysis table include a cardinality threshold that causes the at least one processor to:

identify a first variable, of the plurality of variables, having a first cardinality that is less than the cardinality threshold;

identify a second variable, of the plurality of variables, having a second cardinality that is greater than the cardinality threshold;

populate the post-analysis table with a first plurality of the individual values that correspond to the first variable; and refrain from populating the post-analysis table with a second plurality of the individual values that correspond to the second variable.

11. The system of claim 9, wherein the one or more parameters for generating the post-analysis table include one or more filter parameters that cause the at least one processor to:

populate the post-analysis table with a first plurality of the individual values that satisfy the one or more filter parameters; and refrain from populating the post-analysis table with a second plurality of the individual values that does not satisfy the one or more filter parameters.

12. The system of claim 9, wherein the rule-generation GUI further enables the at least one user to set a user-defined sliding time window for the anomaly detection rule.

13. The system of claim 12, wherein the rule-generation GUI further enables the at least one user to define an aggregation column to associate with the user-defined sliding time window for the anomaly detection rule.

14. The system of claim 12, wherein the time window of the aggregation table is a common sliding time window, and wherein the computer-readable instructions further cause the at least one processor to:

convert the user-defined sliding time window into the common sliding time window based at least in part on a predetermined scaling factor.

15. The system of claim 12, wherein the computer-readable instructions further cause the at least one processor to:

aggregate the event data into the aggregation table by setting a plurality of rule satisfaction counts, for a plurality of individual rule rows that correspond to the anomaly detection rule, based on the individual values matching the predefined values during individual time-ranges associated with the ones of the plurality of individual rule rows; and generate a sliding summation of at least some of the plurality of rule satisfaction counts to determine when the sliding summation exceeds the occurrence threshold during the user-defined sliding time window.

16. The system of claim 9, wherein the computer-readable instructions further cause the at least one processor to select between a plurality of data-processing platforms for generating the post-analysis table based on one or more characteristics of the event data.

17. The system of claim 9, wherein generating the post-analysis table in accordance with the one or more parameters includes preemptively populating the post-analysis table with a set of the individual values that correspond to a particular variable that is within the null subset of the plurality of variables.

18. A computer-implemented method, comprising:

causing a device to display a rule-generation graphical user interface (GUI) that enables at least one user to define an anomaly detection rule and to one or more parameters for generating a post-analysis table in association with the anomaly detection rule;

generating an aggregation table that includes an individual rule row that corresponds to the anomaly detection rule, wherein the individual rule row indicates the predefined values for a user-selected subset of a plurality of variables;

receiving event data that indicates for individual events, of a plurality of events, individual values corresponding to at least some of the plurality of variables;

aggregate the event data into the aggregation table by setting a rule satisfaction count for the individual rule row; and generating the post-analysis table in accordance with the one or more parameters responsive to a determination that the rule satisfaction count exceeds an occurrence threshold.

19. The computer-implemented method of claim 18, wherein the one or more parameters for generating the post-analysis table include a cardinality threshold.

20. The computer-implemented method of claim 18, wherein the one or more parameters for generating the post-analysis table include one or more filter parameters.

* * * * *